(12) United States Patent
Rosa

(10) Patent No.: US 10,770,250 B1
(45) Date of Patent: Sep. 8, 2020

(54) FLOAT ASSEMBLY

(71) Applicant: Carlos Rosa, Camuy, PR (US)

(72) Inventor: Carlos Rosa, Camuy, PR (US)

(*) Notice: Subject to any disclaimer, the term of this patent is extended or adjusted under 35 U.S.C. 154(b) by 0 days.

(21) Appl. No.: 16/373,737

(22) Filed: Apr. 3, 2019

Related U.S. Application Data

(60) Provisional application No. 62/652,493, filed on Apr. 4, 2018.

(51) Int. Cl.
*H01H 35/18* (2006.01)
*G01F 23/44* (2006.01)
*B67C 3/00* (2006.01)
*G01F 23/00* (2006.01)
*G01F 23/60* (2006.01)

(52) U.S. Cl.
CPC .............. *H01H 35/18* (2013.01); *B67C 3/007* (2013.01); *G01F 23/0038* (2013.01); *G01F 23/0061* (2013.01); *G01F 23/443* (2013.01); *G01F 23/603* (2013.01)

(58) Field of Classification Search
CPC .............................. G01F 23/603; H01H 35/18
See application file for complete search history.

(56) References Cited

U.S. PATENT DOCUMENTS

| 5,155,311 A | * | 10/1992 | Utke | ...................... H01H 36/02 200/81.4 |
| 2006/0275136 A1 | * | 12/2006 | Liu | ...................... F04D 15/0218 417/40 |

* cited by examiner

*Primary Examiner* — Paul M. West
(74) *Attorney, Agent, or Firm* — Luis Figarella

(57) ABSTRACT

A float assembly comprising a float traveling along a rod until making contact with either an upper or a lower adjustable stopper, so that an actuator lever having one or more counterweights in mechanical coupling with a switch, so that the float assembly may respond to the fluid level.

2 Claims, 5 Drawing Sheets

FLOAT ASSEMBLY

CROSS-REFERENCE TO RELATED APPLICATIONS

This application claims priority to co-pending U.S. Provisional patent application Ser. No. 62/652,493 titled "Float Assembly", filed on Apr. 4, 2019 the disclosure of which is herein incorporated by reference in its entirety.

PATENTS CITED

The following documents and references are incorporated by reference in their entirety, Lindemann (U.S. Pat. No. 1,666,498), Zane (U.S. Pat. No. 3,464,437), Reeve (U.S. Pat. No. 2,791,964), Issachar (U.S. Pat. No. 6,218,949) and Griffith (U.S. Pat. No. 2,496,467).

FIELD OF THE INVENTION

The present invention relates to an apparatus and system for achieving a desired fluid level within a container, and specifically to a fluid float apparatus.

DESCRIPTION OF THE RELATED ART

Many types of liquid level sensing devices have been disclosed in the prior art. Such devices, which are usually based on magnetic, electrical conductivity, acoustic or optical parameters, enable user manipulation of the positioning of the sensing elements for either facilitating the operation of the liquid level sensor itself or the issue of a sensible output at a desired liquid level in the monitored vessel, in accordance with one or more predetermined sensing elements.

Most of the liquid level monitoring and alarm systems described in the prior art, including those based on a floating magnet, are not versatile and usually have drawbacks and/or are not convenient for user manipulation. There exists a need for a float level capable of easy access and operation.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a float operated electric switch actuating mechanism comprising; an electric switch, a float, a frame limiting the displacement of a rod to a vertical dimension, wherein said float slides along the length of said rod in response to the fluid level, said rod having a cross beam mechanically connected to said electric switch so that the beam activates/deactivates said switch as said rod moves, an adjustable upper limit nut located along the upper portion of said rod and an adjustable lower limit nut located along the lower portion of said rod. In another aspect, said beam's pivot point is mechanically linked to said frame. In yet another aspect, a weight is located at said beam's first end. In another aspect, a weight is located at the said pivot point.

In another aspect, the invention is about a method for operating a float operated electric switch actuating mechanism, said method comprising providing a float mechanism comprised of an electric switch, a float, a frame limiting the displacement of a rod to a vertical dimension, wherein said float slides along the length of said rod in response to the fluid level, said rod having a cross beam mechanically connected to said electric switch so that the beam activates/deactivates said switch as said rod moves, an adjustable upper limit nut located along the upper portion of said rod and an adjustable lower limit nut located along the lower portion of said rod and using the inputs from the above float to selectively refill a fluid volume. In another aspect, said beam's pivot point is mechanically linked to said frame. In yet another aspect, a weight is located at said beam's first end. In another aspect, a weight is located at the said pivot point.

Other features and advantages of the present invention will become apparent upon examining the following detailed description of an embodiment thereof, taken in conjunction with the attached drawings.

Figure 1:
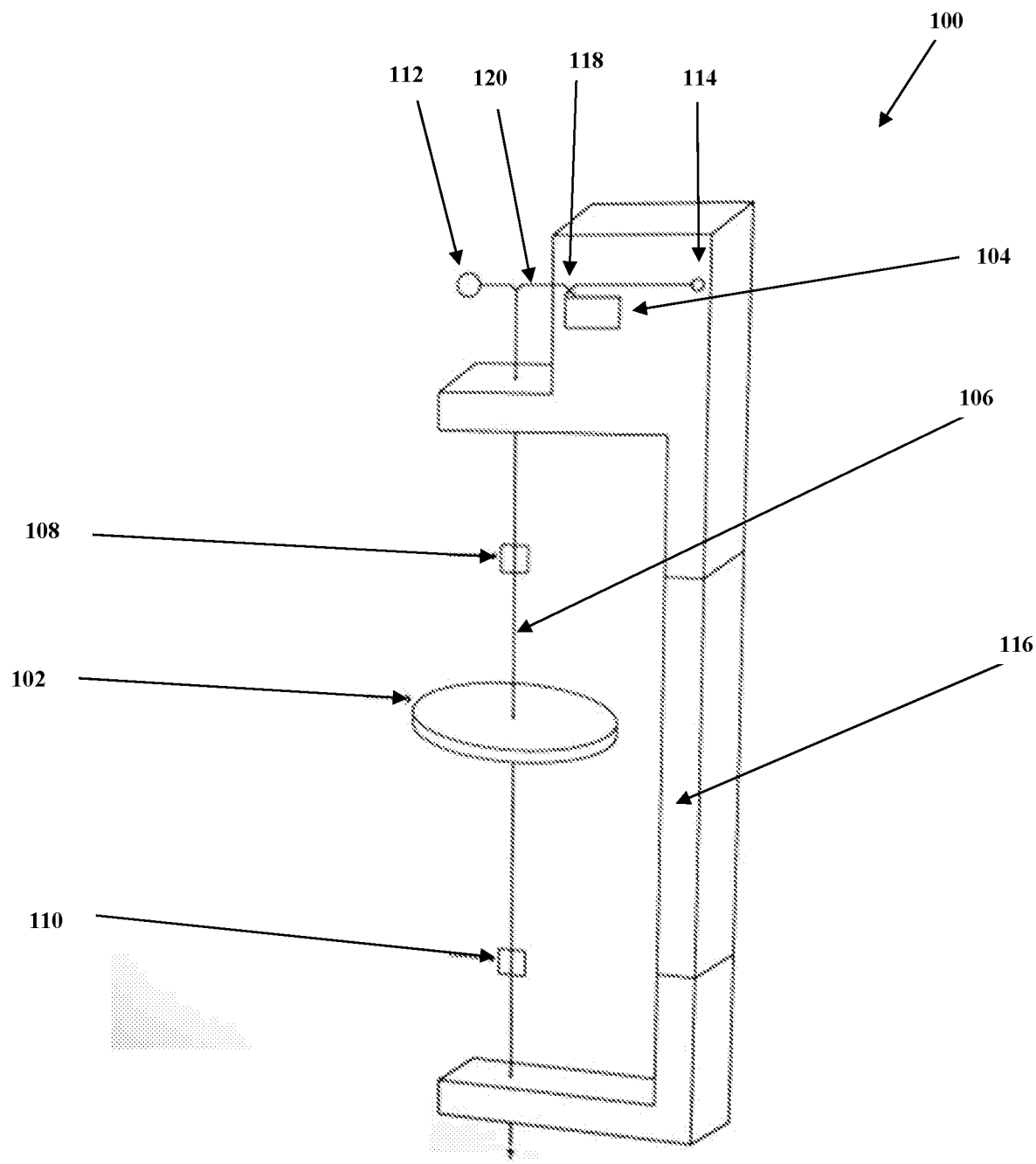
FIG. 1 shows a view of a proposed float assembly, according to an exemplary embodiment of the invention.
Figure 2:
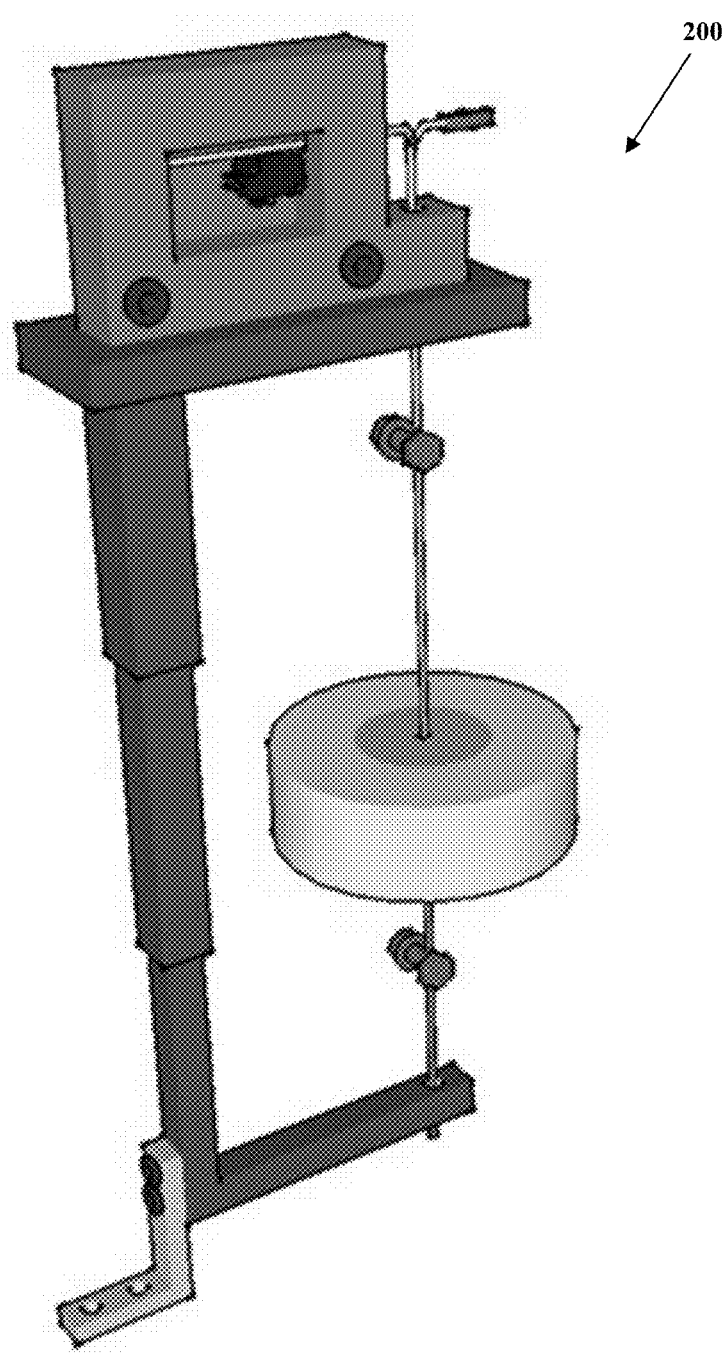
FIG. 2 shows a side view of a proposed float assembly, according to an exemplary embodiment of the invention.
Figure 3:
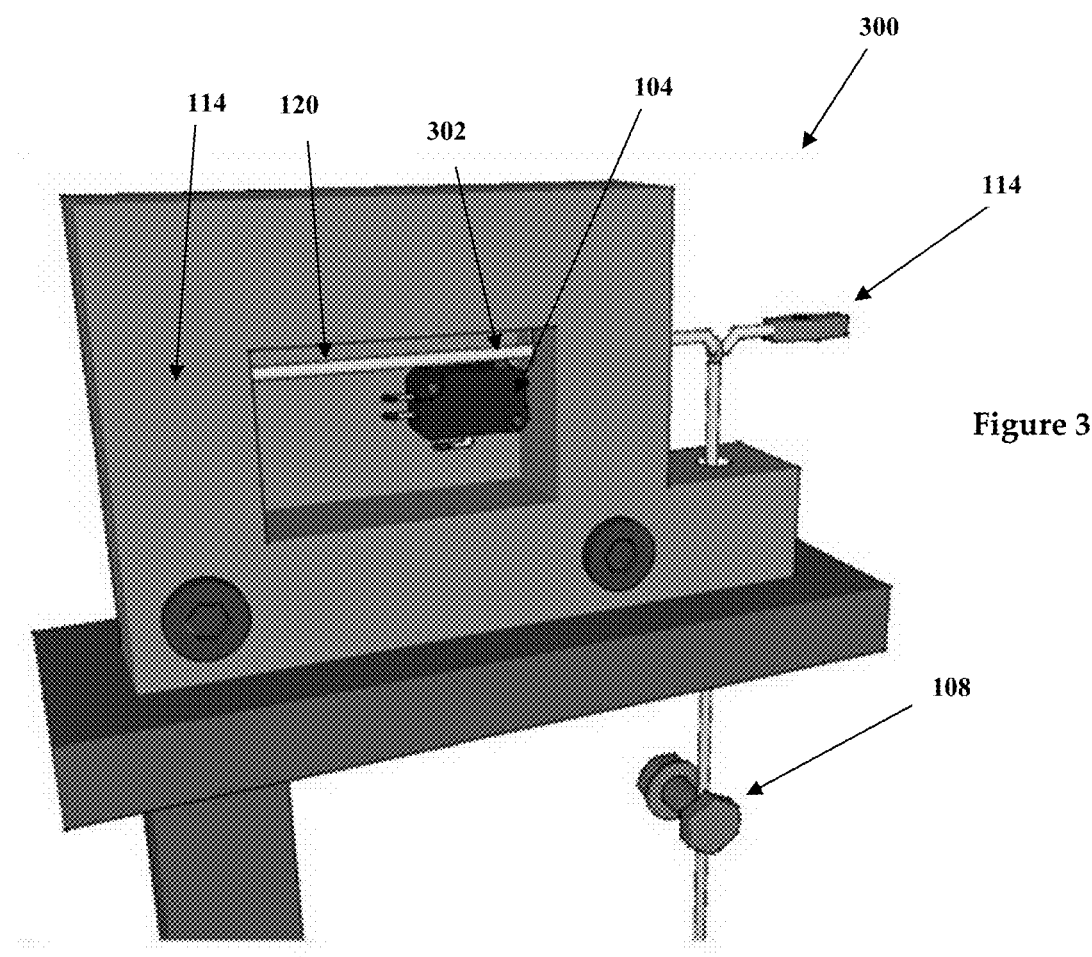
FIG. 3 shows details of the switch assembly, according to an exemplary embodiment of the invention.
Figure 4:
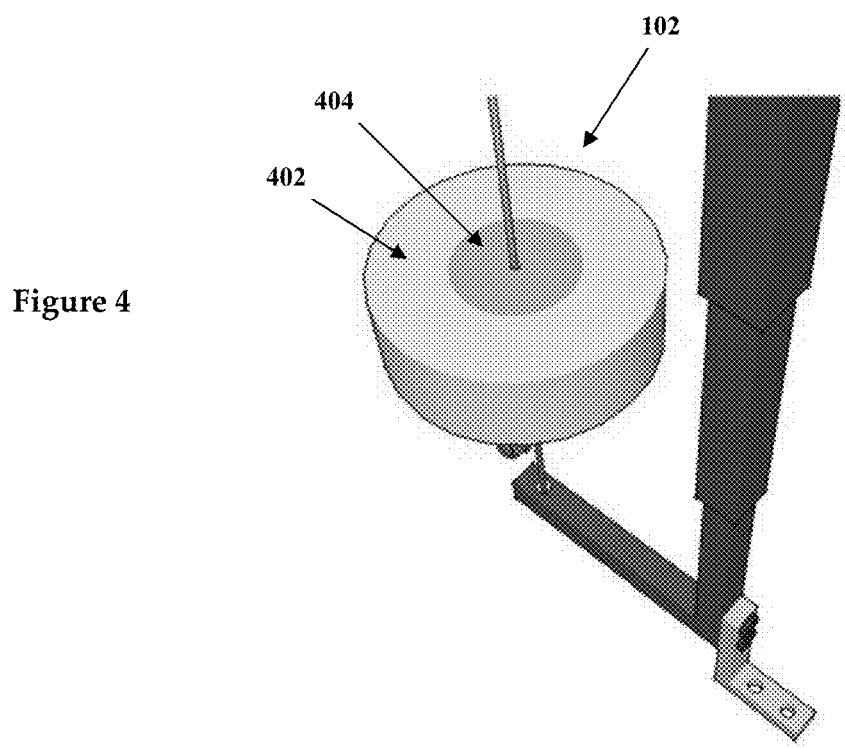
FIG. 4 shows details of the float in the assembly, according to an exemplary embodiment of the invention.
Figure 5:
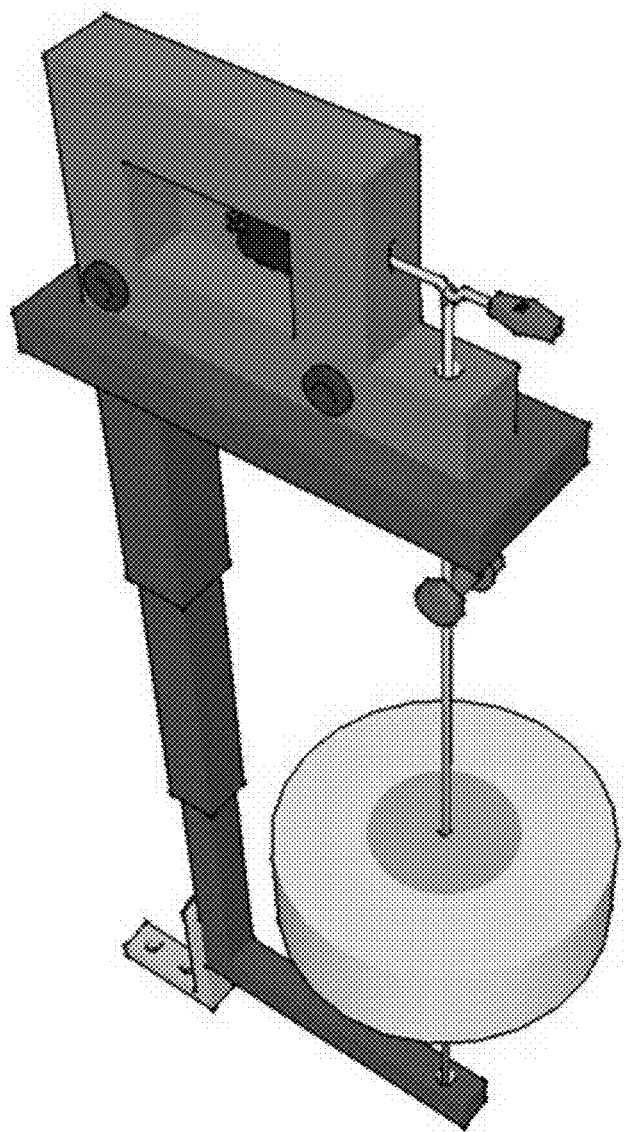
FIG. 5 shows a side top view of a proposed float assembly, according to an exemplary embodiment of the invention.
Figure 6:
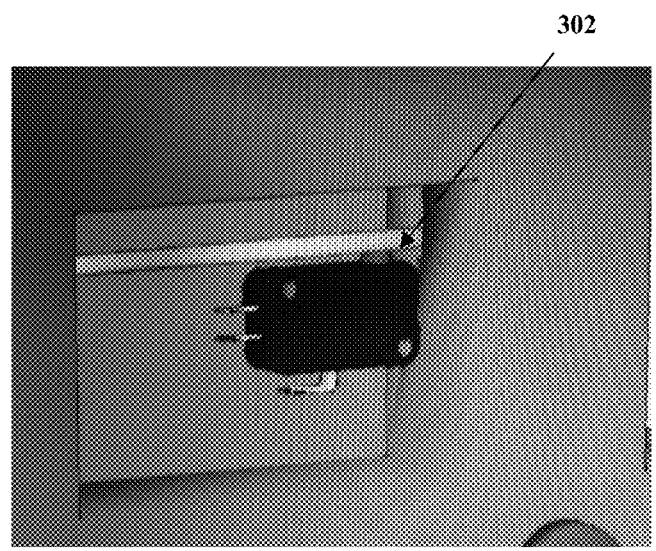
FIG. 6 shows details of the switch activation lever to the switch, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see the embodiment of a float assembly 100 in which the movement of a float 102 attached to a rod 106 operates an electric switch or microswitch 104. In one embodiment, the rod 106 loosely goes through openings at one or both ends of a housing or frame 116 (an exemplary embodiment of a C-frame is shown), which may be attached to the interior of a fluid receptable by one or more brackets.

The movement of the float 102 is based on the flotation of the float within a fluid (preferably a liquid, although the float may float within any fluid), and usually responds to the level of the fluid in which the float 102 resides. The rod's 106 action in response to the up/down movement of the fluid level (as a response to the float 102), causes the electric switch 104 to be actuated/operated, i.e. to transition from one condition (open/close to the complementary one close/open).

The rod 106 movement is caused by the float 102 (which is moving freely along the rod) making contact and pushing against the adjustable upper 108 or lower 110 stoppers. In one embodiment, a single microswitch 104 is used, this has the advantage of eliminating the possibility of dual float positions/status errors. In another embodiment, the axis/shaft may be extended, so that two switches 104 may be activated by the float movement simultaneously and/or sequentially.

The stoppers 108/110 location may be comprised of adjustable fittings such as press fittings, nuts, screws, clips, etc. Adjusting their position allows for short level operation, that is, times when the on/off conditions for the switch are met through small displacements of the float in the water.

The top of the rod 106 has a beam 120 formed by an orthogonal extension on both sides said top, said beam 120 being affixed to said top. A first end or extension of said beam may be fitted with one or more internal or external weight/counterweights 112 combinations, and the opposite extension has a pivot point 114, so that it may pivot the complete beam 120 and apply pressure at the switch point 118 of said beam 120 to activate/deactivate the switch 104 in response to the rod's 106 motion.

In one embodiment, the pivot 114 may be accomplished by attaching the end or near end portion of said beam 120 to the housing or frame 116, so that the motion of the rod 106 causes the pressure at the switch point 118 of said beam 120 to activate/deactivate the switch 104.

In another embodiment, the pivot 114 is simply attached to a weight, so that a 'see-saw' motion (between the weights 112 and that attached to the pivot 114 results in the activation/deactivation of the switch point 118.

The counterweights 112 act as a lever so that the unit may be zeroed and/or the switch be placed/biased in a desired state (open or closed switch) repeatedly. Of course, a common problem with all switches is the 'bouncing' action that may occur when the float 102 excerts pressure on the stopper 108/110 if there is any wave action or fast fluid ripples within the fluid tank. One way to minimize the above, is to have mass to the rod. Of course, too much mass, and the system would always be 'behind' the fluid level.

In one embodiment, adjustable resiliency to the bounce can be accomplished through the 'tilting' of a beam 120 places across the rod top. By then placing variable weights 112 (with pivot point 114 being fixed or another weight) both ends of said beam and then adjusting their relative mass to each other, the beam is biased to go up or down in response to the float hitting the upper or lower stoppers 108/110 in relation to the mass ratio of the weights 112. For example, weight 112 works in lifting the beam from the switch point 118, while pivot 114 is more closely related to keeping it pressed down if affixed, but may be helped if left free with a weight.

In addition, the addition of mass through the counterweights 112 is effective in filtering out float 'bounce' or surface wave action which otherwise could result in rapid on/off switch 104 activation. In this fashion, the counterweight pairing of 112 bias or maintain the switch in one position until the float rises forcing it to the other limit.

It may be placed on the same axis as the buoy. While the float is between the two limits defined by the upper and lower nuts, the system will remain in one state (through the switch action), and once below a level it switches to the other state.

In one embodiment, the float 102 body has internal mass (metal, cement, aggregate, concrete, mortar) placed inside its body, so that the wave action of the fluid's surface is dampened. This, in combination with the mass of the counterweight 112 is effective in filtering out float 'bounce' or surface wave action which otherwise could result in rapid on/off switch 104 activation. The above provides a very precise volume measurement of both the fluid within the tank as well as of the fluid added to the tank.

FIGS. 2-6 show other views (200, 300, 400) of the unit, further detailing the lever or beam 120 contact with the switch actuation point 302. In addition we see the float 102 comprised of an inner core 404 and the outer core 402.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A float operated electric switch actuating mechanism comprising;
   an electric switch;
   a float;
   a frame limiting the displacement of a rod to a vertical dimension, wherein said float slides along the length of said rod in response to the fluid level, said rod having a cross beam mechanically connected to said electric switch so that said cross beam movement activates/deactivates said switch as said rod moves;
   wherein said cross beam's pivot point is mechanically linked to said frame at a near end, said cross beam makes contact with said switch at a point between said near end and said mechanical connection to said rod and said cross beam further extends to form said beam's distal end;
   an adjustable upper limit nut located along the upper portion of said rod; and
   an adjustable lower limit nut located along the lower portion of said rod.

2. A method for operating a float operated electric switch actuating mechanism, said method comprising;
   providing a float mechanism comprised of an electric switch, a float, a frame limiting the displacement of a rod to a vertical dimension, wherein said float slides along the length of said rod in response to the fluid level, said rod having a cross beam mechanically connected to said electric switch so that said cross beam movement activates/deactivates said switch as said rod moves, wherein said cross beam's pivot point is mechanically linked to said frame at a near end, said cross beam makes contact with said switch at a point between said near end and said mechanical connection to said rod and said cross beam further extends to form said beam's distal end, an adjustable upper limit nut located along the upper portion of said rod and an adjustable lower limit nut located along the lower portion of said rod; and
   using the inputs from the above float to selectively refill a fluid volume.

* * * * *